United States Patent
Johns et al.

(10) Patent No.: US 9,545,649 B2
(45) Date of Patent: Jan. 17, 2017

(54) METHOD FOR SAFELY AND QUICKLY SHUTTING DOWN AND CLEANING A HYDROPROCESSING REACTOR OF SPENT CATALYST VIA A WATER FLOODING TECHNIQUE

(71) Applicant: Chevron U.S.A. Inc., San Ramon, CA (US)

(72) Inventors: Jeff William Johns, Draper, UT (US); Steven Alden Souers, Ocean Springs, MS (US); Douglas Gayle McDaniel, Moss Point, MS (US); David Lawrence Cooke, San Rafael, CA (US); David Michael Bosi, Napa, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 44 days.

(21) Appl. No.: 14/723,130

(22) Filed: May 27, 2015

(65) Prior Publication Data
US 2016/0346815 A1 Dec. 1, 2016

(51) Int. Cl.
| | |
|---|---|
| *B08B 9/08* | (2006.01) |
| *B08B 9/093* | (2006.01) |
| *B08B 9/34* | (2006.01) |
| *B01J 38/10* | (2006.01) |
| *B08B 5/04* | (2006.01) |
| *B08B 9/28* | (2006.01) |

(52) U.S. Cl.
CPC ............ *B08B 9/08* (2013.01); *B01J 38/10* (2013.01); *B08B 5/04* (2013.01); *B08B 9/093* (2013.01); *B08B 9/283* (2013.01); *B08B 9/34* (2013.01)

(58) Field of Classification Search
CPC ............ B08B 9/00; B08B 9/08; B08B 9/0813; B08B 9/093; B08B 9/283; B08B 9/34; B08B 2205/00; B08B 2209/00; B01J 8/0496; B01J 8/0285; B01J 8/067; B01J 38/04; B01J 2208/00837
See application file for complete search history.

(56) References Cited

U.S. PATENT DOCUMENTS

| | | | |
|---|---|---|---|
| 3,052,624 A | 9/1962 | Kush | |
| 6,619,571 B1 | 9/2003 | Hourticolon et al. | |
| 2011/0315639 A1 | 12/2011 | Debevec et al. | |
| 2013/0291898 A1* | 11/2013 | Nath | ........................ B08B 9/00 134/19 |
| 2014/0273794 A1 | 9/2014 | Fridman et al. | |
| 2014/0299558 A1 | 10/2014 | Martz et al. | |
| 2015/0096309 A1* | 4/2015 | Mathur | ................... F25D 31/00 62/62 |

\* cited by examiner

*Primary Examiner* — Saeed T Chaudhry
(74) *Attorney, Agent, or Firm* — Terrence M. Flaherty

(57) ABSTRACT

Processes for shutting down a hydroprocessing reactor and for removing catalyst from the reactor may comprise shutting off hydrocarbon feed to the reactor, stripping hydrocarbons from the catalyst, cooling the reactor to a first threshold reactor temperature, purging the reactor with $N_2$ gas, introducing water into the reactor, and dumping the catalyst from the reactor, wherein the first threshold reactor temperature may be substantially greater than 200° F. In an embodiment, the water may be introduced into the reactor via a quench gas distribution system when the reactor is at a second threshold reactor temperature not greater than 200° F. to cool the reactor to a third threshold reactor temperature not greater than 120° F.

18 Claims, 3 Drawing Sheets

METHOD FOR SAFELY AND QUICKLY SHUTTING DOWN AND CLEANING A HYDROPROCESSING REACTOR OF SPENT CATALYST VIA A WATER FLOODING TECHNIQUE

TECHNICAL FIELD

This disclosure relates to processes for shutting down a hydroprocessing reactor and for removing catalyst from the reactor via a water flooding technique.

BACKGROUND

Hydroprocessing units must be shutdown periodically to conduct maintenance and to change catalyst. Unit shutdown procedures must be developed and executed with excellence to protect personnel, prevent incidents, and to minimize costs and duration.

There is a need for hydroprocessing reactor shutdown processes that can be conducted with maximum efficiency and minimum duration while safeguarding personnel and equipment.

SUMMARY

In an embodiment there is provided a process for shutting down a hydroprocessing reactor and for removing catalyst from the reactor, the process comprising shutting off hydrocarbon feed to the reactor; stripping hydrocarbons from the catalyst; cooling the reactor to a first threshold reactor temperature; after the hydrocarbon stripping step, purging the reactor with $N_2$ gas; after the purging step, and when the reactor is at a second threshold reactor temperature, introducing water into the reactor; and dumping a catalyst slurry from the reactor, the catalyst slurry comprising the catalyst and the water, wherein the first threshold reactor temperature is greater than (>) 200° F. (93° C.).

In another embodiment there is provided a process for shutting down a hydroprocessing reactor and for removing catalyst from the reactor, the process comprising shutting off hydrocarbon feed to the reactor; thereafter, stripping hydrocarbons from the catalyst at a temperature greater than the final reactor operating temperature; after the hydrocarbon stripping step, cooling the reactor; when the reactor temperature falls to a first threshold reactor temperature, purging the reactor with $N_2$ gas; after the purging step, and when the reactor is at a second threshold reactor temperature, introducing water into the reactor, wherein the second threshold reactor temperature is lower than the first threshold reactor temperature; and dumping the catalyst from the reactor, wherein the reactor includes a quench gas distribution system, and the water introducing step comprises introducing at least a portion of the water into the reactor via the quench gas distribution system.

In yet another embodiment there is provided a process for shutting down a hydroprocessing reactor and for removing catalyst from the reactor, the process comprising shutting off hydrocarbon feed to the reactor; stripping hydrocarbons from the catalyst at a temperature above the final reactor operating temperature; cooling the reactor with $H_2$ gas at a controlled reactor cooling rate to a first threshold reactor temperature, wherein the reactor includes a quench gas distribution system, and at least a portion of the $H_2$ gas is introduced into the reactor via the quench gas distribution system; when the reactor is at a first threshold reactor temperature, circulating $N_2$ gas through the reactor during at least one pressure/depressure cycle of the reactor; thereafter, and when the reactor is at a second threshold reactor temperature, introducing water into the reactor; when the reactor is flooded with the water, dumping a catalyst slurry from the reactor, wherein the dumped catalyst slurry comprises the catalyst and the water; separating the water from the dumped catalyst slurry to provide separated water; optionally, recycling at least a portion of the separated water to the reactor; after the dumping step, vacuuming residual catalyst from the reactor; thereafter, assessing the patency of a plurality of quench apertures of the quench gas distribution system; and washing at least one internal component of the reactor with pressurized water. The controlled cooling rate is not more than ($\leq$) 25° F. (14° C.) per 15 minute interval. The first threshold reactor temperature is in the range from 205° F. to 300° F., and the second threshold reactor temperature is not greater than ($\leq$) 200° F. The water introduced into the reactor during the water introducing step has a temperature not less than ($\geq$) 50° F. (10° C.) and a chloride content not more than ($\leq$) 50 ppm.

Further embodiments of processes for shutting down a hydroprocessing reactor and for removing catalyst from the reactor are described hereinbelow. As used herein, the terms "comprising" and "comprises" mean the inclusion of named elements or steps that are identified following those terms, but not necessarily excluding other unnamed elements or steps.

DETAILED DESCRIPTION

Figure 1A:
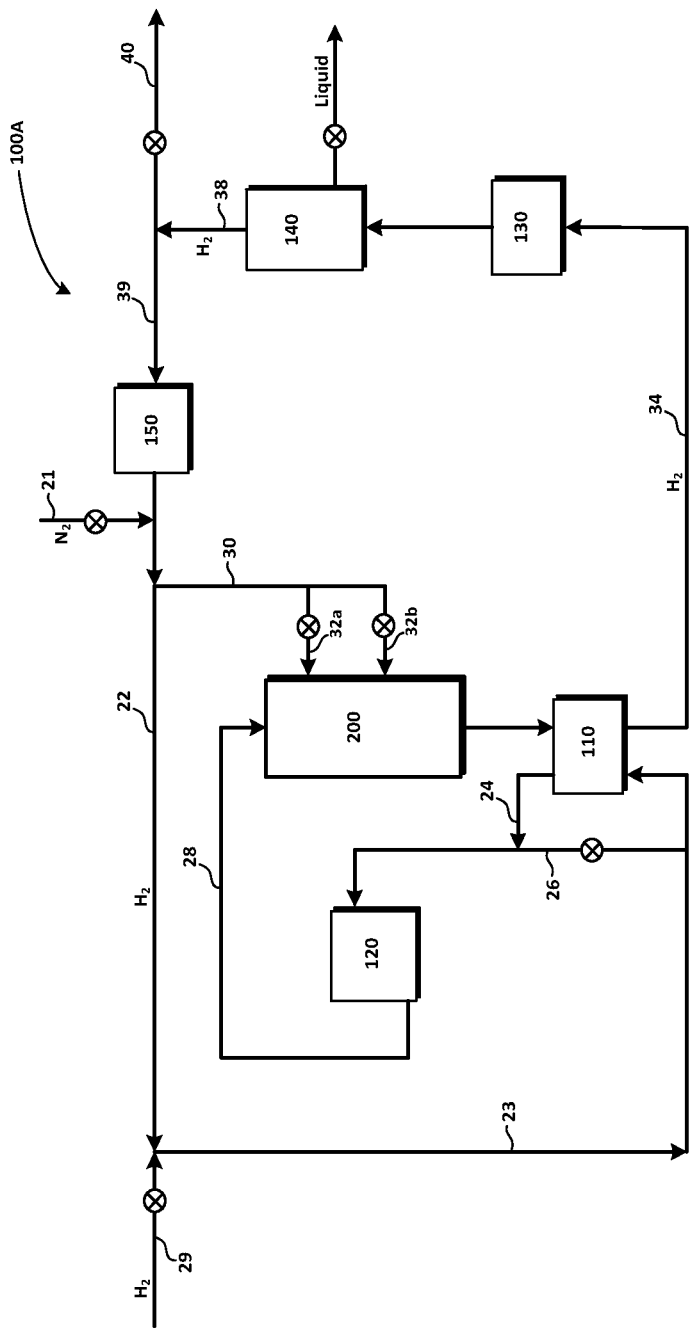
FIG. 1A schematically represents a system and a scheme for the flow of hydrogen gas during shutdown of a hydroprocessing reactor, according to an embodiment of the invention.

Hydroprocessing reactor shutdown processes must be done safely to protect personnel yet quickly to minimize lost production. Spent catalyst has self-heating properties; in the presence of oxygen it can spontaneously heat up as it oxidizes. During conventional shutdowns, reactors have been kept under inert nitrogen during shutdown and cleanup to prevent catalyst contact with oxygen. Inert vessel entry, e.g., entering a reactor under nitrogen gas, exposes personnel to possible nitrogen asphyxiation and has resulted in fatalities. Also, only specially trained personnel are allowed to enter reactors kept under inert conditions, thereby routinely preventing engineers from performing inspections, possibly leading to sub-standard work and premature future shutdowns.

Shutdown processes as disclosed herein eliminate many of the problems associated with prior art shutdown procedures. Furthermore, shutdown processes as disclosed herein have the advantage of providing fast and efficient reactor cooling to a temperature allowing manual entry into the reactor. Such processes have the further advantage of minimizing damage to valuable equipment of a hydroprocessing system. Moreover, such processes have the additional advantage of decreased danger to personnel during reactor shutdown and cleaning Such shutdown processes may comprise a plurality of component methods, or phases, as described hereinbelow i) Shutting Off Hydrocarbon Feed to the Reactor In an embodiment, processes for shutting down a hydroprocessing reactor and for removing catalyst from the reactor as disclosed herein (hereafter "shutdown processes") may comprise shutting off hydrocarbon feed to the reactor. Prior to shutting off the hydrocarbon feed, a final operating temperature of the reactor may be recorded.

ii) Stripping Hydrocarbon from the Catalyst

After the hydrocarbon feed to the reactor has been discontinued, shutdown processes may further comprise stripping hydrocarbons from the catalyst. Hydrocarbon stripping may be conducted at a temperature greater than the final reactor operating temperature. Prior to shutting off the hydrocarbon feed to the reactor, a final operating temperature, $T_F$, of the reactor may be recorded. The reactor may then be heated above temperature $T_F$ to minimize the required stripping time.

In an embodiment, hydrocarbons may be stripped from the catalyst with circulating $H_2$ gas at a minimum temperature not less than ($T_F$+25° F.); that is to say, hydrocarbons may be stripped from the catalyst at a temperature at least 25° F. (14° C.) above the final reactor operating temperature. In an embodiment, hydrocarbon stripping may be conducted at a maximum temperature at, or approaching, the design limit of the reactor. In an embodiment, hydrocarbon stripping of the catalyst in the reactor may be continued for a minimum time period of 6 hours or not less than two hours after the latest time point at which liquid hydrocarbon is detected in the separators downstream of the reactor.

During the hydrocarbon stripping phase, recycled gas may be combined with makeup $H_2$. In an embodiment, reformer $H_2$ may be eliminated from the source of makeup $H_2$ during the hydrocarbon stripping phase in order to minimize or prevent the introduction of liquefied petroleum gas (LPG) and benzene into the reactor. In addition, during the hydrocarbon stripping phase, all liquid hydrocarbons may be drained from low points, separators, and knock-out pots to prevent recontamination of the catalyst with extraneous hydrocarbons.

iii) Cooling the Reactor

The reactor may be cooled by circulating a gaseous medium through the reactor. In an embodiment, the gaseous medium may comprise a gas selected from $H_2$ gas, $N_2$ gas, and combinations thereof. In an embodiment, the gaseous medium circulating through the reactor may comprise recycle gas together with makeup $H_2$, in which case reformer $H_2$ may be removed from the makeup $H_2$ source during the reactor cooling phase to minimize catalyst contamination by benzene and light hydrocarbons.

During the reactor cooling phase, the reactor temperature may be monitored at a plurality of reactor locations, e.g., at a plurality of locations on the reactor skin (exterior surface), while the reactor is cooled to a first threshold reactor temperature. The "first threshold reactor temperature" may be defined as the reactor temperature at which the reactor cooling phase terminates, or may be terminated, without delaying the shutdown process and while safeguarding personnel and equipment. The first threshold reactor temperature will generally be greater than (>) 200° F. In an embodiment, the first threshold reactor temperature may be in the range from 205° F. to 300° F. (96° C. to 149° C.), or from 210° F. to 275° F. (99° C. to 135° C.), or from 210° F. to 250° F. (99° C. to 121° C.).

Unless otherwise specified, reference herein to "reactor temperature" refers to the highest temperature recorded at a given time point by a plurality of temperature indicators, wherein each temperature indicator is configured for independently monitoring the temperature of the reactor skin at a corresponding plurality of reactor skin locations.

In an embodiment, the reactor cooling phase may comprise cooling the reactor at a controlled reactor cooling rate so as to prevent equipment damage. In an embodiment, the reactor may be cooled at the controlled reactor cooling rate to the first threshold reactor temperature with circulating $H_2$ gas and/or $N_2$ gas. In an embodiment, reactor cooling may be accelerated, within the constraints of various cooling rate criteria for preventing equipment damage, e.g., by maximizing the gas circulation rate and by maximizing the unit pressure.

Various criteria related to temperature differences, e.g., between the reactor inlet and outlet fluid temperatures and between different locations of the reactor, may be strictly adhered to during the entire shutdown process in order to minimize the risk of equipment damage. Changes in both flow rate and temperature of fluids introduced into the reactor should be made in steady increments to prevent abrupt temperature changes. In an embodiment, the rate of cooling the reactor, including the catalyst beds within the reactor, may be limited to not greater than 25° F. (14° C.) per 15 minute interval.

The reactor may be cooled at a controlled cooling rate using one or more methods for controlling the rate of reactor cooling. As non-limiting examples, the rate of reactor cooling during the reactor cooling phase can be controlled by adjusting various parameters, such as the gas circulation rate, the unit pressure, reactor effluent heat exchange with the recycle gas, the furnace setting, and the recycle compressor speed (see, for example, FIG. 1A, infra).

In an embodiment, the reactor may include a quench gas distribution system configured for distributing quench gas within the reactor during reactor operation mode (hydroprocessing). During shutdown processes, the reactor cooling phase may comprise introducing at least a portion of the $H_2$ gas into the reactor via the quench gas distribution system. At the same time, a further portion of the $H_2$ gas may be introduced into the reactor via the reactor inlet (see, for example, FIGS. 1A and 2A). The use of the quench gas distribution system, in combination with the reactor inlet, for introducing the $H_2$ gas into the reactor may serve to distribute the $H_2$ gas within the reactor, resulting in more uniform cooling of the reactor and faster overall cooling of the reactor.

iv) Removing $H_2$ Gas from the Reactor

After cooling the reactor, the shutdown process may further comprise introducing $N_2$ gas into the reactor to remove $H_2$ and light hydrocarbon gases from the reactor. In an embodiment, $H_2$ and light hydrocarbon gases may be removed from the reactor by circulating $N_2$ gas through the reactor during at least one pressure/depressure cycle, e.g., by alternately pressuring and depressuring the reactor and associated system (see, e.g., FIG. 1A). In an embodiment, the $N_2$ gas introducing phase may involve a plurality of alternating pressure/depressure cycles, wherein the pressure in the reactor may be increased by the introduction of $N_2$ gas into the reactor to a relatively high pressure and thereafter the reactor may be depressured by removing the $N_2$ gas from the reactor to provide a relatively low pressure in the reactor, and the pressure/depressure cycle may be repeated as appropriate.

The $N_2$ gas introducing phase may also be referred to as the purging phase, wherein the reactor may be purged by the introduction of $N_2$ gas into the reactor. At the termination of the purging phase, the shutdown process may further comprise quantifying the hydrocarbon content of the effluent discharged from the reactor; and, based on the hydrocarbon content, determining a lower explosive limit (LEL) for the reactor effluent.

After the hydrocarbons and $H_2$ gas have been removed from the reactor and the catalyst contained therein is under inert conditions, the shutdown process may further comprise installing the blinds so as to isolate the reactor from liquid or gaseous hydrocarbon ingress. In an embodiment, the LEL for the reactor effluent will be determined to be less than 10% before the blinds are installed on the reactor. In an embodiment, the catalyst may be maintained under inert conditions until the reactor has undergone water flooding, i.e., for the duration of the water introducing phase of the shutdown process, infra.

During the $N_2$ gas introducing phase, the reactor may undergo further cooling. Such cooling during the $N_2$ gas introducing phase may be predominantly ambient cooling. The reactor may undergo still further (ambient) cooling during the installation of the reactor blinds. In an embodiment, the first threshold reactor temperature may be selected such that after the $N_2$ introducing phase and after the installation of the reactor blinds, the reactor may typically be at, or near, a second threshold reactor temperature. The "second threshold reactor temperature" may be defined herein as the reactor temperature at which the water introducing phase may be commenced while safeguarding personnel and equipment. In an embodiment, the second threshold reactor temperature may be not greater than ($\leq$) 200° F. In a sub-embodiment, the second threshold reactor temperature may typically be in the range from 195° F. to 200° F. (about 91° C. to 93° C.), or from 198° F. to 200° F. (about 92° C. to 93° C.).

By estimating the degree of reactor cooling taking place during the $N_2$ gas introducing phase and during the installation of blinds, shutdown processes as disclosed herein allow the reactor cooling phase (supra) to be terminated at a first threshold reactor temperature substantially above the second threshold reactor temperature, thereby shortening the duration of the shutdown. For example, by terminating the reactor cooling phase at a temperature substantially greater than 200° F., the shutdown process may be expedited by harnessing ambient cooling of the reactor during the $N_2$ gas introducing phase as well as during blind installation.

v) Introducing Water into the Reactor

When the reactor is at a second threshold reactor temperature, the water introducing phase of the shutdown process may be commenced. The introduction of water into the reactor rapidly cools the reactor to a third threshold reactor temperature. The "third threshold reactor temperature" may be defined herein as the reactor temperature at which personnel may safely enter the reactor. In an embodiment, the third threshold reactor temperature may be not greater than ($\leq$) 120° F. (49° C.), or $\leq$110° F. (43° C.), or $\leq$100° F. (38° C.).

The water may be introduced into the reactor at a controlled reactor fill rate. In an embodiment, the maximum reactor fill rate may be determined for a given reactor according to the reactor dimensions, e.g., the diameter of the reactor. In an embodiment, e.g., when the reactor may lack a quench gas distribution system, the water introducing phase may be commenced at a relatively low reactor fill rate, e.g., during a first fill phase, and the reactor fill rate may thereafter be sequentially increased, e.g., during a second fill phase and a third fill phase of the water introducing phase.

In embodiments wherein the reactor includes a quench gas distribution system, the water introducing phase may be commenced at a high (e.g., maximal) reactor fill rate via the quench gas distribution system. In an embodiment, the reactor fill rate may be in the range from 25 to 400 gallons per minute (gpm) (about 95 to 750 liters per minute), or from 35 to 350 gpm.

The water introduced into the reactor during the water introducing phase may be at a temperature not less than ($\geq$) 50° F. (10° C.). In an embodiment, the water introduced into the reactor during the water introducing phase may typically be at a temperature within the range from 50° F. to 150° F. (10° C. to 66° C.), or from 50° F. to 100° F. (10° C. to 38° C.). In an embodiment, the water introduced into the reactor may be at ambient temperature and ambient pressure. The water introduced into the reactor during the water introducing phase may have a chloride content not greater than ($\leq$) 50 ppm. In a sub-embodiment, the water introduced into the reactor during the water introducing phase may be selected from condensed water, industrial water, treated water, reverse osmosis water, and potable water, and combinations thereof.

In an embodiment, the water introducing phase may comprise flooding the reactor with the water. The term "flooding" may be used herein to refer to introducing water into a hydroprocessing reactor to at least partially fill the reactor with water. During reactor flooding, at least one catalyst bed of the reactor may be submerged by the water, and typically all of the catalyst beds of the reactor may be submerged by the water.

In an embodiment, preliminary to the water introducing phase, a maximum hydrostatic head pressure may be determined for a given reactor, wherein the maximum pressure corresponds to a maximum amount of water in the reactor (e.g., when the reactor is completely filled). The increase in hydrostatic head pressure may be monitored during the water introducing phase. The water introducing phase may then be discontinued before the maximum hydrostatic head pressure is attained so as to avoid overfilling the reactor. Applicant has observed that overfilling the reactor may unnecessarily delay the shutdown process or startup, e.g., due to saturated insulation slowing heatup of the reactor shell and subsequent reduced pressure operation. In an embodiment, the water introducing phase may be discontinued at a pressure 2-5 psi below (<) the determined maximum hydrostatic pressure for a given reactor.

In an embodiment, the reactor may include a quench gas distribution system, as is well known in the art of hydroprocessing. In an embodiment, the water introducing phase may comprise introducing at least a portion of the water into the reactor via the quench gas distribution system. The quench gas distribution system may comprise at least one quench line and at least one quench ring in fluid communication with the quench line. Each quench ring may have a plurality of quench apertures, e.g., arranged at an upper part of the quench ring (see, e.g., FIGS. 2A-2B).

A water supply line may be coupled to at least one quench line for distributing at least a portion of the water within the reactor during the water introducing phase. In an embodiment, most (>50%) of the water introduced into the reactor during the water introducing phase may be introduced via the quench gas distribution system. In a sub-embodiment, all (100%) of the water introduced into the reactor during the water introducing phase may be introduced via the quench gas distribution system. Applicant has observed that introducing at least a portion of the water into the reactor via the quench gas distribution system serves to distribute the water more uniformly within the reactor, thereby avoiding localized cooling of the reactor so as to decrease the risk of equipment damage.

In another embodiment, a substantial portion of the water introduced into the reactor during the water introducing phase may be introduced via the reactor inlet and/or via the reactor process outlet. In embodiments wherein the reactor lacks a quench gas distribution system, all of the water introduced into the reactor during the water introducing phase may be introduced via the reactor inlet and/or the reactor process outlet.

vi) Dumping Catalyst from the Reactor

When the reactor is at least partially filled with the water (e.g., flooded), the shutdown process may further comprise dumping the catalyst from the reactor. The reactor may comprise a plurality of catalyst beds. Typically, all of the catalyst beds will be submerged with the water prior to commencing the dumping phase. In an embodiment, the introduction of water into the reactor may be continued during the dumping phase, or, stated differently, the dumping phase may be conducted concurrently with the water introducing phase.

The catalyst dumped from the reactor may be in the form of a catalyst slurry comprising the catalyst and the water. Water may be rapidly and efficiently separated from the dumped catalyst slurry using various techniques, including catalyst-water separation via mesh or screens of different configurations using, e.g., gravity or suction to remove the water from the catalyst slurry (see, e.g., commonly assigned US Patent Pub. No. 2014/0299558A1). The water separated from the dumped catalyst slurry may be referred to herein as "separated water." In an embodiment, the separated water may be recycled to the reactor. Recycling the separated water to the reactor may serve to maintain hydrostatic head pressure, or to mitigate loss in such pressure, during the dumping phase. In another embodiment, the separated water may be captured, stored, and/or treated, as described hereinbelow.

In an embodiment, the reactor may optionally be at least partially re-filled with water after an initial reactor dump, and the dumping procedure may be repeated. In an embodiment, during a procedure for re-filling the reactor with water after an initial dump, water may be introduced into the reactor at the maximum fill rate for a given reactor.

vii) Vacuuming Residual Catalyst from the Reactor

In an embodiment, a portion of the catalyst may be retained within the reactor as "residual catalyst" after the catalyst dumping phase. Typically, the residual catalyst will represent only a small fraction of the total catalyst present in the reactor prior to commencement of the catalyst dumping phase. In an embodiment, the shutdown process may further comprise vacuuming any such residual catalyst from the reactor after the dumping phase has removed most of the catalyst. By the expression "vacuuming residual catalyst from the reactor" is meant removing residual catalyst from the reactor via suction, e.g., using a suction device capable of drawing a partial vacuum. In an embodiment, the vacuuming phase may comprise vacuuming the residual catalyst without disturbing the catalyst support balls, or the like, on the catalyst support trays.

Removing residual catalyst from the reactor by vacuuming is faster than prior art methods, such as shoveling or raking catalyst, thereby expediting the shutdown process even further. Furthermore, personnel shoveling piles of catalyst are exposed to the risk of engulfment, which could result in injury or fatality; vacuuming residual catalyst from the reactor decreases or eliminates such risks. Removing residual catalyst from the reactor by vacuuming has the added advantage of leaving less catalyst fines in the reactor internals, thereby decreasing the time required to wash the reactor internals (see, e.g., ix) Washing Reactor Internals, infra). Reactor internals are disclosed, for example, in commonly assigned U.S. Pat. No. 8,202,498, Multiphase contact and distribution apparatus for hydroprocessing.

viii) Assessing the Integrity of Quench Systems

In an embodiment, the reactor may include a quench gas distribution system. The shutdown process may further comprise assessing the integrity of the quench gas distribution system. In an embodiment, assessing the integrity of the quench gas distribution system may be conducted after the vacuuming phase for the removal of residual catalyst from the reactor. The quench gas distribution system may comprise at least one quench line, at least one quench ring in fluid communication with the quench line, and a plurality of quench apertures arranged at an upper part of each quench ring.

In a sub-embodiment, assessing the integrity of the quench gas distribution system may include testing the system for leaks, e.g., at welds and the flanges of each quench ring. In another sub-embodiment, assessing the integrity of the quench gas distribution system may comprise assessing the patency of the quench ring(s) and of a plurality of quench apertures of the quench ring(s). The expression "patency" as used herein with reference to the quench rings and quench apertures refers to the degree of openness of each such quench ring and aperture, or, stated differently, the lack of blockage of such quench ring(s) and apertures. In an embodiment, assessing the integrity of the quench gas distribution system may involve coupling a water supply line to at least one quench line for supplying water to the quench ring(s).

In an embodiment, a quench aperture having complete patency (i.e., no occlusion of the aperture) delivers water at a certain rate or in a characteristic manner, e.g., to produce a water spout of a particular height. In an embodiment, the degree of patency of each quench aperture may be assessed, for example, based on the height of the water spout delivered therefrom. In an embodiment, the water supply line may be coupled to at least one quench line preliminary to filling the reactor with water during the previously described water introducing phase, such that the same water supply line may be used to supply water to the quench rings for both the water introducing phase and the assessment of quench system integrity.

ix) Washing Reactor Internals

The reactor may include a plurality of internal components, e.g., for fluid mixing and distribution within the reactor during hydroprocessing operations. Such internal components are generally known in the art, and may be referred to collectively as reactor internals. The shutdown process may comprise washing at least one internal component of the reactor with pressurized water. In an embodiment, washing the reactor internals may be done after assessing the patency of the quench apertures, supra. In an embodiment, the reactor internals may be washed using pressurized water at a pressure less than 5000 psi. As a non-limiting example, the reactor internals may be washed with water from a pressure washer capable of generating a maximum pressure <5,000 psi, e.g., using a domestic- or household grade pressure washer. Advantageously, such pressure washers can be operated by all personnel. The use of pressure washers operating at a maximum pressure <5,000 psi speeds up the shutdown process and costs less, as compared with the use of higher pressure washers (operating at pressures >5,000 psi) as used in some prior art processes.

x) Hydro-Drilling Aggregated Catalyst

During hydroprocessing operations, some of the catalyst may aggregate or form clusters of catalyst (e.g., due to coking) Occasionally, such aggregated catalyst may remain in the reactor after the catalyst dumping phase has terminated, and such aggregated catalyst may be difficult to remove from the reactor without the use of specialized equipment or procedures.

In an embodiment, the reactor shutdown process may optionally include a hydro-drilling phase, wherein aggregated catalyst may be hydro-drilled in situ in the reactor. In an embodiment, the hydro-drilling equipment for removing aggregated catalyst during the hydro-drilling phase may comprise a water-operated mechanical drill. In an embodiment, during the hydro-drilling phase, the hydro-drilling equipment may be disposed within the reactor for the in situ removal of the aggregated catalyst, while the hydro-drilling equipment may be operated remotely by personnel located outside the reactor. Accordingly, the hydro-drilling technique eliminates the risk of personnel being engulfed in catalyst during the removal of aggregated catalyst from the reactor. Hydro-drilling also avoids the use of mechanical work to break up the coked catalyst; such mechanical work is slower and more labor intensive as well as being less safe.

xi) Monitoring for the Presence of Nickel Carbonyl

In an embodiment, the catalyst may comprise dispersed nickel sulfides. Under certain conditions, carbon monoxide in the reactor may react with nickel sulfides to form nickel carbonyl ($Ni(CO)_4$). Nickel carbonyl is known to be highly toxic. Nickel carbonyl is also known to undergo thermal decomposition at higher reactor temperatures, e.g., above 400° F. (about 200° C.), but may accumulate at lower temperatures during the reactor cooling phase.

Applicant has determined threshold carbon monoxide concentrations below which the concentration of nickel carbonyl will be less than 1 ppb (the eight hour threshold limit value (TLV)). Accordingly, during the reactor cooling phase the shutdown process may further comprise recording the carbon monoxide concentration of the effluent discharged from the reactor. In an embodiment, the reactor may not be cooled below a nickel carbonyl threshold temperature (e.g., <400° F.) until carbon monoxide is purged from the reactor and its associated system, e.g., the CO concentration of the reactor effluent has fallen below a carbon monoxide threshold (e.g., 10 ppm). If the reactor temperature inadvertently falls below the nickel carbonyl threshold temperature while the carbon monoxide concentration remains above the carbon monoxide threshold, the shutdown process may further comprise re-heating the reactor above the nickel carbonyl threshold temperature for a time period sufficient to thermally decompose (i.e., eliminate) any nickel carbonyl that may have formed.

xii) Handling Waste Water from Reactor Flooding

As noted hereinabove, during or following the catalyst dumping phase of the shutdown process, water may be rapidly and efficiently separated from the dumped catalyst slurry. In an embodiment, at least a portion of the separated water may be captured, analyzed for contaminants, and subsequently treated in a waste water handling phase of the shutdown process. Separated water that is captured or stored for treatment may also be referred to herein as "waste water."

In an embodiment, the waste water handling phase may comprise quantitatively analyzing the separated water for the presence of contaminants to provide quantitative contaminant data, and, based on the quantitative contaminant data, determining a schedule for releasing the separated water to a refinery waste water system. During this phase of the shutdown process, the rate of releasing the waste water to the refinery waste water system may be carefully controlled to be within the treating limits of the refinery waste water system.

Embodiments of the invention will now be further described with reference to the drawings. FIG. 1A schematically represents a system and scheme for the flow of a gaseous medium, e.g., comprising $H_2$ gas, during shutdown of a hydroprocessing reactor.

For the sake of clarity, the description of FIG. 1A refers primarily to $H_2$ gas, it being understood that during various stages of the shutdown process a gaseous medium may comprise, for example, $N_2$ gas in lieu of, or in addition to, $H_2$ gas.

System 100A of FIG. 1A may comprise a first heat exchanger 110, a furnace 120, a second heat exchanger 130, a separator 140, a recycle compressor 150, and a reactor 200. In FIG. 1A, each of first heat exchanger 110 and second heat exchanger 130 may comprise or represent one or a plurality of heat exchanger units. Components of system 100A of FIG. 1A may be used during an operation mode (e.g., hydroprocessing) or a shutdown mode. System 100A may be used in conjunction with various other components (not shown) during the operation mode as well as during the shutdown mode. Additional components (not shown) that may be used in conjunction with system 100A, may include without limitation a feed pump, additional heat exchangers, e.g., as preheat upstream or downstream from the feed pump, a $H_2S$ absorber, e.g., downstream from separator 140, a distillation unit, and a reactor effluent/distillation preheat exchanger.

During a shutdown mode of system 100A, a shutdown process may comprise a hydrocarbon stripping phase and a reactor cooling phase. During the hydrocarbon stripping phase, $H_2$ gas may flow from recycle compressor 150 via lines 22 and 23 to first heat exchanger 110, via a line 24 to furnace 120, and via a line 28 to reactor 200. During the hydrocarbon stripping phase, first heat exchanger 110 may be used for heating the recycle $H_2$ gas. The heated $H_2$ gas may enter reactor 200 via the reactor inlet (see, e.g., FIG. 2A), and flows through reactor 200 to strip hydrocarbons from the catalyst. The $H_2$ gas discharged from the outlet of reactor 200 may be recycled via a line 34 to second heat exchanger 130, and via separator 140 and lines 38 and 39 to recycle compressor 150. Makeup $H_2$ gas may be delivered via a line 29 for combination with the recycle gas from recycle compressor 150.

With further reference to FIG. 1A, hydrogen flow during the cooling phase of the shutdown process may differ from that in the hydrocarbon stripping phase. During the reactor cooling phase, $H_2$ gas may flow to reactor 200 via quench gas distribution lines 32a, 32b (see, e.g., FIGS. 2A-2B) in addition to the reactor inlet. During the reactor cooling phase, first heat exchanger 110 may be used to control the reactor cooling rate, by heating the recycle gas before it enters reactor 200. Depending on the required rate of reactor cooling, at least a portion of the recycle gas may bypass first heat exchanger 110 via a line 26 to provide cooler recycle gas for increased reactor cooling.

Further cooling of the recycle gas may be provided by second heat exchanger 130. Furthermore, during the later stages of the reactor cooling phase, e.g., when the reactor temperature approaches the temperature of the recycle gas from recycle compressor 150, the compressor speed may be reduced to decrease the temperature of the recycle gas discharged from recycle compressor 150, thereby further increasing the reactor cooling rate.

With still further reference to FIG. 1A, the shutdown process may also include a $N_2$ gas introducing phase. The $N_2$ gas introducing phase may involve circulating $N_2$ gas through the reactor during at least one reactor pressure/depressure cycle. In an embodiment, during the $N_2$ gas introducing phase $N_2$ gas may be injected, e.g., via a line 21, to pressure reactor 200 and $N_2$ gas may be released, e.g., via a line 40, to depressure reactor 200. The $N_2$ gas introducing phase of the shutdown process is not limited to any particular scheme for $N_2$ gas flow.

In system/scheme 100A of FIG. 1A, reactor 200 may represent or comprise a plurality of reactors, which may be arranged in series or in parallel. Furthermore, some hydroprocessing units may have multiple modules that can be shutdown separately while other modules continue operating. It is to be understood that variations in the flow scheme of FIG. 1A may occur in some hydroprocessing units, e.g., the flow of $H_2$ gas or other gaseous medium during reactor shutdown processes may be other than as specifically shown in FIG. 1A, without departing from the scope of the appended claims. The flow of $H_2$ gas during the hydrocarbon stripping phase and the reactor cooling phase of the shutdown process is not limited to any particular scheme or hydroprocessing system.

As noted hereinabove, the shutdown process may also include a water introducing phase, during which reactor 200 may be flooded with water. The water introducing phase may involve introducing water, having defined chemical and physical parameters or characteristics, into the reactor at a controlled fill rate. In an embodiment, water for flooding the reactor during the water introducing phase may flow to reactor 200 as schematically represented in FIG. 1B.

Figure 1B:
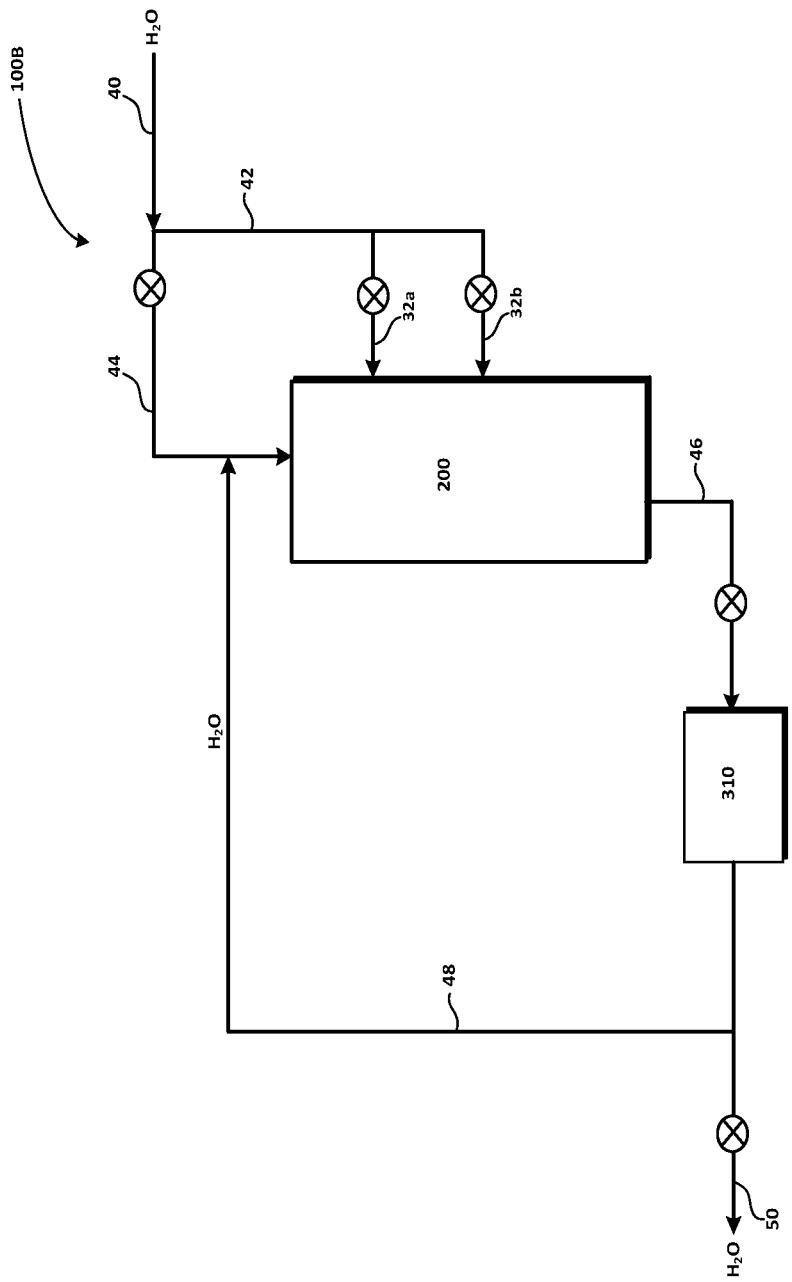
FIG. 1B schematically represents a system and a scheme for the flow of water during shutdown of a hydroprocessing reactor, according to an embodiment of the invention.

With reference to FIG. 1B, system/scheme 100B may comprise reactor 200 (see, e.g., FIG. 1A). Water from a line 40 may be introduced into reactor 200 via a water supply line 42 coupled to quench lines 32a, 32b, wherein the water may be introduced into reactor 200 in a distributed manner, e.g., via a plurality of quench apertures (see, e.g., FIGS. 2A-2B). Alternatively or additionally, water for flooding reactor 200 may be introduced into reactor 200 at the reactor inlet via a line 44 (see, e.g., FIG. 2A). In an embodiment, water for flooding reactor 200 may be introduced into reactor 200 via the reactor process outlet (the latter not shown in FIG. 1B).

Figures 2A, 2B:
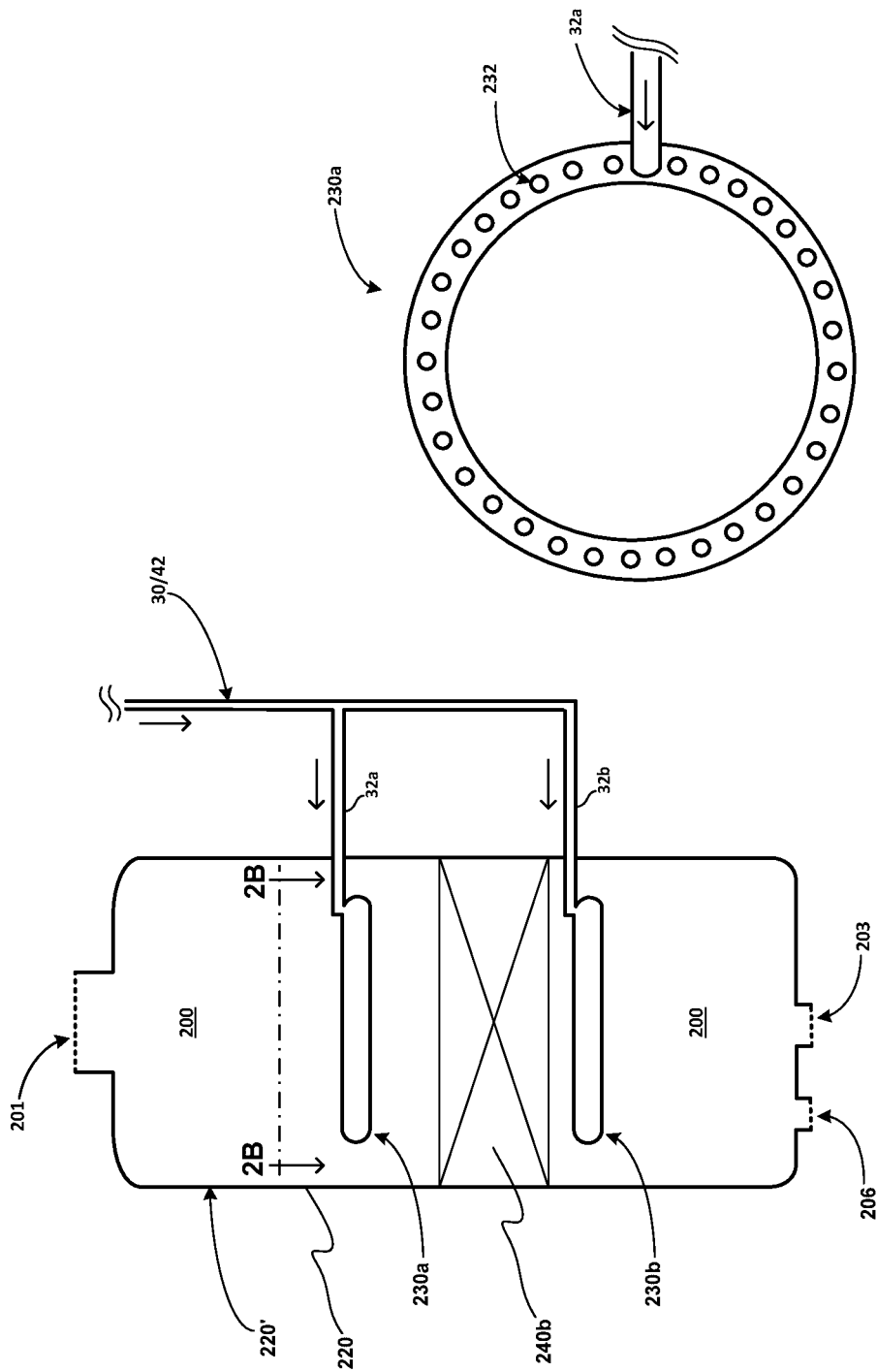
FIG. 2A is a schematic sectional view of a reactor having a quench gas distribution system, according to an embodiment of the invention.
FIG. 2B shows a quench ring of the reactor of FIG. 2A as seen in plan view.

When reactor 200 is flooded with water, the catalyst may be dumped from reactor 200 via a line 46, wherein line 46 may be coupled to a catalyst dump pipe 206 of reactor 200 (see, e.g., FIG. 2A). The catalyst dumped from reactor 200 may be in the form of a catalyst slurry comprising the catalyst and the water. The dumped catalyst (e.g., slurry) may flow via line 46 to a water/catalyst separation unit 310 for separating the water from the catalyst. In an embodiment, at least a portion of the separated water may be recycled to reactor 200 via a line 48. Alternatively or additionally, at least a portion of the separated water may flow via a line 50 for capture, storage, and/or treatment. The separated water flowing via line 50 may also be referred to herein as "waste water." In an embodiment, the waste water may be treated by a refinery waste water system, e.g., as described hereinabove. In an embodiment, reactor 200 may optionally be at least partially re-filled with water, e.g., via line 42 and/or line 44, after an initial reactor dump, and the dumping procedure via line 46 may be repeated.

FIG. 2A is a schematic sectional view of a reactor having a quench gas distribution system. Reactor 200 may comprise a reactor inlet 201, a reactor process outlet 203, and catalyst dump pipe 206. In an embodiment, reactor 200 may be substantially cylindrical and vertically oriented. Reactor 200 may further comprise a reactor wall 220 and a reactor exterior surface or skin 220'. Temperature indicators (not shown) may be disposed at a plurality of locations, e.g., on reactor skin 220', for monitoring the reactor temperature during various phases of the shutdown process.

With further reference to FIG. 2A, the quench gas distribution system of reactor 200 may comprise first and second quench lines 32a and 32b in fluid communication with first and second quench rings 230a and 230b, respectively. First and second quench lines 32a and 32b may be in fluid communication with line 30 during the reactor cooling phase of the shutdown process for receiving $H_2$ gas from recycle compressor 150 (see, e.g., FIG. 1A); and first and second quench lines 32a and 32b may be in fluid communication with line 42 during the water introducing phase of the shutdown process for receiving water from line 40 (see, e.g., FIG. 1B). The direction of fluid flow (e.g., $H_2$ gas or liquid $H_2O$) through quench lines 32a and 32b is indicated by arrows in FIGS. 2A-2B.

FIG. 2A shows two quench rings 230a and 230b. In an embodiment, reactor 200 may have other numbers of quench rings, and the number of quench rings may be equal to the number of catalyst beds of reactor 200. Shutdown processes as disclosed herein are not limited to reactors having any particular number(s) of catalyst beds or quench rings. Only one catalyst bed, 240b, is shown in FIG. 2A for the sake of clarity of illustration.

FIG. 2B shows quench ring 230a of FIG. 2A as seen in plan view along the line 2B-2B of FIG. 2A. Quench ring 230a may have a plurality of quench apertures 232. Quench ring 230a, including quench apertures 232, may be configured for the distribution of fluid (e.g., $H_2$ gas) flowing therefrom. In an embodiment, quench apertures 232 may be arranged, at least primarily, at an upper part of quench ring 230a. Quench ring 230b may be essentially the same as, or substantially identical to, quench ring 230a. Quench rings 230a and 230b may be assembled as a plurality of sections using flanges (not shown), as is known in the art.

In reactors that lack a quench gas distribution system, gas(es) for cooling reactor 200 and liquid water for flooding reactor 200 may be introduced into reactor 200 via reactor inlet 201. In an embodiment, the water for flooding reactor 200 may be introduced into reactor 200 via reactor process outlet 203.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All publications, patents, and patent applications cited in this application are herein incorporated by reference in their entirety to the same extent as if the disclosure of each individual publication, patent application, or patent was specifically and individually indicated to be incorporated by reference in its entirety.

The drawings are representational and may not be drawn to scale. Modifications of the exemplary embodiments disclosed above may be apparent to those skilled in the art in light of this disclosure. Accordingly, the invention is to be construed as including all structure and methods that fall within the scope of the appended claims. Unless otherwise specified, the recitation of a genus of elements, materials or other components, from which an individual component or mixture of components can be selected is intended to include all possible sub-generic combinations of the listed components and mixtures thereof.

What is claimed is:

1. A process for shutting down a hydroprocessing reactor and for removing catalyst from the reactor, wherein the reactor includes a quench gas distribution system, the process comprising:
   a) shutting off hydrocarbon feed to the reactor;
   b) stripping hydrocarbons from the catalyst;
   c) cooling the reactor to a first threshold reactor temperature;
   d) after step c), purging the reactor with $N_2$ gas;
   e) after step d), and when the reactor is at a second threshold reactor temperature, introducing water into the reactor via the quench gas distribution system; and
   f) dumping a catalyst slurry from the reactor, the catalyst slurry comprising the catalyst and the water, wherein the first threshold reactor temperature is greater than 200° F.

2. The process according to claim 1, wherein the first threshold reactor temperature is in the range from 205° F. to 300° F.

3. The process according to claim 1, wherein the second threshold reactor temperature is not greater than 200° F.

4. The process according to claim 1, wherein step b) comprises circulating $H_2$ gas through the reactor at a temperature at least 25° F. above a final operating temperature of the reactor.

5. The process according to claim 4, further comprising:
   g) at the termination of step d), quantifying the hydrocarbon content of the effluent discharged from the reactor; and
   h) based on the hydrocarbon content, determining a lower explosive limit for the reactor effluent.

6. The process according to claim 1, wherein step c) comprises circulating $H_2$ gas through the reactor, and the process further comprises:
   i) during step c), recording the carbon monoxide concentration of the effluent discharged from the reactor; and
   j) if the reactor temperature falls below a nickel carbonyl threshold temperature while the recorded carbon monoxide concentration is above a carbon monoxide threshold, re-heating the reactor above the nickel carbonyl threshold temperature for a time period sufficient to thermally decompose nickel carbonyl.

7. The process according to claim 1, wherein:
   step c) comprises circulating $H_2$ gas through the reactor, the reactor includes a quench gas distribution system, and during step c) at least a portion of the $H_2$ gas is introduced into the reactor via the quench gas distribution system.

8. The process according to claim 1, wherein:
   the water introduced into the reactor according to step e) is at a temperature not less than 50° F., and the water introduced into the reactor according to step e) cools the reactor to a third threshold reactor temperature not greater than 120° F.

9. The process according to claim 1, wherein step e) comprises flooding the reactor with the water.

10. The process according to claim 1, wherein the water introduced into the reactor according to step e) has a chloride content not greater than 50 ppm.

11. The process according to claim 1, further comprising:
    k) concurrently with step f), separating the water from the dumped catalyst slurry to provide separated water, and
    l) recycling the separated water to the reactor.

12. The process according to claim 1, wherein a portion of the catalyst is retained within the reactor as residual catalyst after step f), and the process further comprises:
    m) vacuuming the residual catalyst from the reactor.

13. The process according to claim 12, wherein the reactor includes at least one quench ring having a plurality of quench apertures therein, and the process further comprises:
    n) after step m), supplying water to the quench ring; and
    o) during step n), assessing the patency of the quench apertures based on the height of a water spout delivered from each of the quench apertures.

14. The process according to claim 1, further comprising:
    p) after step f), washing the reactor internals with pressurized water at a pressure less than 5,000 psi.

15. The process according to claim 1, wherein after step f) the reactor contains aggregated catalyst, and the process further comprises:
    q) after step f), hydro-drilling the aggregated catalyst.

16. The process according to claim 1, further comprising:
    r) after step f), separating the water from the catalyst slurry to provide separated water,
    s) quantitatively analyzing the separated water for the presence of contaminants to provide quantitative contaminant data, and
    t) based on the quantitative contaminant data, determining a schedule for releasing the separated water to a refinery waste water system.

17. The process according to claim 1, wherein:
    the first threshold reactor temperature is in the range from 205° F. to 300° F.,
    the second threshold reactor temperature is not greater than 200° F., and
    the water introduced into the reactor in step e) cools the reactor to a third threshold reactor temperature not greater than 120° F.

18. A process for shutting down a hydroprocessing reactor and for removing catalyst from the reactor, the process comprising:
    a) shutting off hydrocarbon feed to the reactor;
    b) stripping hydrocarbons from the catalyst at a temperature above the final reactor operating temperature;
    c) cooling the reactor with $H_2$ gas at a controlled reactor cooling rate, wherein the reactor includes a quench gas distribution system, and during step c) at least a portion of the $H_2$ gas is introduced into the reactor via the quench gas distribution system;
    d) when the reactor is at a first threshold reactor temperature, circulating $N_2$ gas through the reactor during at least one pressure/depressure cycle of the reactor;
    e) after step d), and when the reactor is at a second threshold reactor temperature, introducing water into the reactor via the quench gas distribution system;
    f) when the reactor is flooded with the water, dumping a catalyst slurry from the reactor, wherein the dumped catalyst slurry comprises the catalyst and the water;

g) separating the water from the dumped catalyst slurry to provide separated water;

h) optionally, recycling at least a portion of the separated water to the reactor;

i) after step f), vacuuming residual catalyst from the reactor;

j) after step i), assessing the patency of a plurality of quench apertures of the quench gas distribution system; and k) washing at least one internal component of the reactor with pressurized water, wherein:

the controlled cooling rate during step c) is not more than 25° F. per 15 minute interval, the first threshold reactor temperature is in the range from 205° F. to 300° F., the second threshold reactor temperature is not greater than 200° F., and the water introduced into the reactor during step e) has a temperature not less than 50° F. and a chloride content not more than 50 ppm.

* * * * *